US008386060B2

(12) United States Patent  
Miller

(10) Patent No.: US 8,386,060 B2
(45) Date of Patent: Feb. 26, 2013

(54) APPARATUS FOR REMOTELY CONTROLLING COMPUTERS AND OTHER ELECTRONIC APPLIANCES/DEVICES USING A COMBINATION OF VOICE COMMANDS AND FINGER MOVEMENTS

(76) Inventor: Stephen S. Miller, New York, NY (US)

(*) Notice: Subject to any disclaimer, the term of this patent is extended or adjusted under 35 U.S.C. 154(b) by 243 days.

(21) Appl. No.: 12/772,941

(22) Filed: May 3, 2010

(65) Prior Publication Data

US 2010/0207881 A1 Aug. 19, 2010

Related U.S. Application Data

(63) Continuation of application No. 11/422,804, filed on Jun. 7, 2006, now Pat. No. 7,917,235, which is a continuation of application No. 09/609,961, filed on Jul. 1, 2000, now Pat. No. 7,109,970.

(51) Int. Cl.
G09G 5/00 (2006.01)
G05B 15/00 (2006.01)

(52) U.S. Cl. .......................................... 700/83; 345/156

(58) Field of Classification Search .................. 345/156; 700/83
See application file for complete search history.

(56) References Cited

U.S. PATENT DOCUMENTS

| | | |
|---|---|---|
| 4,414,537 A | 11/1983 | Grimes |
| 4,613,139 A * | 9/1986 | Robinson, II ............... 463/37 |
| 4,988,981 A | 1/1991 | Zimmerman et al. |
| 5,166,463 A | 11/1992 | Weber |
| 5,377,303 A | 12/1994 | Firman |
| 5,442,729 A | 8/1995 | Kramer et al. |
| 5,444,462 A | 8/1995 | Wamback |
| 5,486,112 A | 1/1996 | Troudet et al. |
| 5,488,362 A | 1/1996 | Ullman et al. |
| 5,555,533 A | 9/1996 | Peck |
| 5,571,020 A | 11/1996 | Troudet |
| 5,581,484 A | 12/1996 | Prince |
| 5,655,910 A | 8/1997 | Troudet |
| 5,796,354 A | 8/1998 | Cartabiano et al. |
| 5,835,077 A | 11/1998 | Dao et al. |
| 5,950,202 A * | 9/1999 | Durward et al. ............... 1/1 |
| 5,960,447 A | 9/1999 | Holt et al. |
| 5,987,310 A | 11/1999 | Gray |
| 6,012,995 A | 1/2000 | Martin |
| 6,049,327 A | 4/2000 | Walker et al. |
| 6,088,017 A | 7/2000 | Tremblay et al. |
| 6,089,872 A | 7/2000 | Mayhue et al. |

(Continued)

FOREIGN PATENT DOCUMENTS

| | | |
|---|---|---|
| GB | 2302583 A | 1/1997 |
| GB | 2305714 A | 4/1997 |

*Primary Examiner* — Ronald Hartman, Jr.
(74) *Attorney, Agent, or Firm* — Richard T. Black; P. G. Scott Born

(57) ABSTRACT

An apparatus for remotely operating a computer using a combination of voice commands and finger movements. The apparatus includes a microphone and a plurality of control elements in the form of touch-sensitive touchpads and/or motion-sensitive elements that are used to operate the computer and to move an on-screen cursor. At least one touchpad is used to selectively switch between a command-mode of operation in which the computer interprets spoken words as commands for operating the computer and any software applications being used, and a text-mode of operation in which the computer interprets spoken words literally as text to be inserted into a software application. The apparatus is ergonomically designed to enable it to be easily worn and to enable a user to operate a computer from a standing, sitting or reclining position. The apparatus can be used to operate a computer for traditional computing purposes such as word processing or browsing the Internet, or for other purposes such as operating electronic devices such as a television and/ or other household appliances. The apparatus eliminates the need for a keyboard and a mouse to operate a computer. In addition, the apparatus cart be used as a telephone.

10 Claims, 3 Drawing Sheets

U.S. PATENT DOCUMENTS

| | | | |
|---|---|---|---|
| 6,097,369 A | 8/2000 | Wambach | |
| 6,098,886 A | 8/2000 | Swift et al. | |
| 6,128,004 A | 10/2000 | McDowall et al. | |
| 6,141,643 A | 10/2000 | Harmon | |
| 6,151,208 A | 11/2000 | Bartlett | |
| 6,154,199 A | 11/2000 | Butler | |
| 6,181,778 B1 | 1/2001 | Ohki et al. | |
| 6,227,974 B1 * | 5/2001 | Eilat et al. | 463/40 |
| 6,266,635 B1 | 7/2001 | Sneh | |
| 6,288,709 B1 | 9/2001 | Willner et al. | |
| 6,388,657 B1 | 5/2002 | Natoli | |
| 6,452,584 B1 | 9/2002 | Walker et al. | |
| 6,470,197 B1 | 10/2002 | Tuoriniemi et al. | |
| 6,581,033 B1 | 6/2003 | Reynar et al. | |
| 6,763,320 B2 | 7/2004 | Kimble | |
| 6,885,316 B2 * | 4/2005 | Mehring | 341/21 |
| 7,035,805 B1 * | 4/2006 | Miller | 704/275 |
| 7,109,970 B1 * | 9/2006 | Miller | 345/156 |
| 2001/0040550 A1 | 11/2001 | Vance et al. | |
| 2003/0006962 A1 | 1/2003 | Bajramovic | |
| 2003/0028382 A1 | 2/2003 | Chambers et al. | |
| 2005/0009584 A1 | 1/2005 | Park et al. | |
| 2005/0233707 A1 | 10/2005 | Chen | |
| 2008/0055248 A1 * | 3/2008 | Tremblay et al. | 345/158 |
| 2010/0156783 A1 * | 6/2010 | Bajramovic | 345/156 |

* cited by examiner

APPARATUS FOR REMOTELY CONTROLLING COMPUTERS AND OTHER ELECTRONIC APPLIANCES/DEVICES USING A COMBINATION OF VOICE COMMANDS AND FINGER MOVEMENTS

RELATED APPLICATIONS

This application is a continuation of U.S. patent application Ser. No. 11/422,804, entitled APPARATUS FOR REMOTELY CONTROLLING COMPUTERS AND OTHER ELECTRONIC APPLIANCES/DEVICES USING A COMBINATION OF VOICE COMMANDS AND FINGER MOVEMENTS, filed Jun. 7, 2006 now U.S. Pat. No. 7,917,235, which is a continuation of U.S. patent application Ser. No. 09/609,961 filed Jul. 1, 2000 and issued as U.S. Pat. No. 7,109,970 on Sep. 19, 2006; the aforementioned applications are hereby incorporated by reference.

FIELD OF THE INVENTION

The present invention pertains to apparatus for controlling computers and other electronic appliances/devices, and more particularly to an apparatus that uses voice controls and finger movement to remotely control various devices.

BACKGROUND OF THE INVENTION

Computers are widely used throughout the world by businesses, schools, governments, and in homes. Conventional desktop computers are operated using a keyboard and mouse, wherein the keyboard is typically used to enter text and commands, and the mouse is typically used for cursor navigation on and graphic control of the computer screen. Although conventional keyboards and mouse are typically coupled to a computer via cables, wireless keyboards and wireless mouse which operate over infrared or radio frequencies are also used to operate computers. In addition, for laptop computers, alternative mechanisms for cursor navigation and graphic control of a screen such as touchpads, track balls, and pointer sticks have been designed. Conventional keyboards and mouse of the type just described all suffer from several drawbacks. Specifically, they must be used together in order to operate a computer. In addition, most keyboards and mouse must be used on a flat horizontal surface. Moreover, due to the small size and low resolution of the
screens of both desktop and laptop computers, the user must be positioned in close proximity to the screen in order to view the information displayed thereon.

Several recent advances in technology are changing the way conventional computers are used. First, the advent of voice recognition systems which enable a user to give commands to a computer to insert text into a software application by speaking into a microphone is eliminating the need for keyboards. Second, new ways of viewing computers are being developed which no longer require the user to be positioned close to a stationary screen. These include large, high-resolution, flat-panel displays which can be wall-mounted, and goggle and monocle visors which are worn on the head. Nevertheless, both of these advances suffer from drawbacks. Specifically, computers using both voice recognition systems and high-definition large-screen, flat panel displays still require the use of a mouse for accurate cursor navigation and for graphic control of the screen. In addition, a user must be positioned in a stationary upright position in order to use the computer, without being able to recline or otherwise move about a room. Another drawback is that conventional computers and voice recognition systems fail to provide a means for enabling a computer to distinguish between spoken commands that operate the computer or a software application, and spoken text that is to be inserted literally into a software application. It is therefore an object of the present invention to provide an apparatus for remotely controlling computers and other electronic appliances/devices using a combination of voice commands and finger movements, which apparatus does not require the use of either a keyboard or a mouse.

SUMMARY

An apparatus for remotely operating a computer using a combination of voice commands and finger movements. The apparatus includes a plurality of control elements in the form of touch-sensitive touchpads and/or motion-sensitive elements that are used to operate the computer and to move an on-screen cursor. At least one touchpad is used to selectively switch between a command-mode of operation in which a user can issue spoken commands for selecting applications and for instructing the computer, and a text-mode of operation in which the user speaks the text to be inserted into an application. The apparatus is ergonomically designed to enable it to be easily worn and to enable a user to operate a computer from a standing, sitting or reclining position. The apparatus can be used to operate a computer for traditional computing purposes such as word processing or browsing the Internet, or for other purposes such as operating electronic devices such as a television and/or other household appliances.

DETAILED DESCRIPTION OF THE INVENTION

Figure 1A:
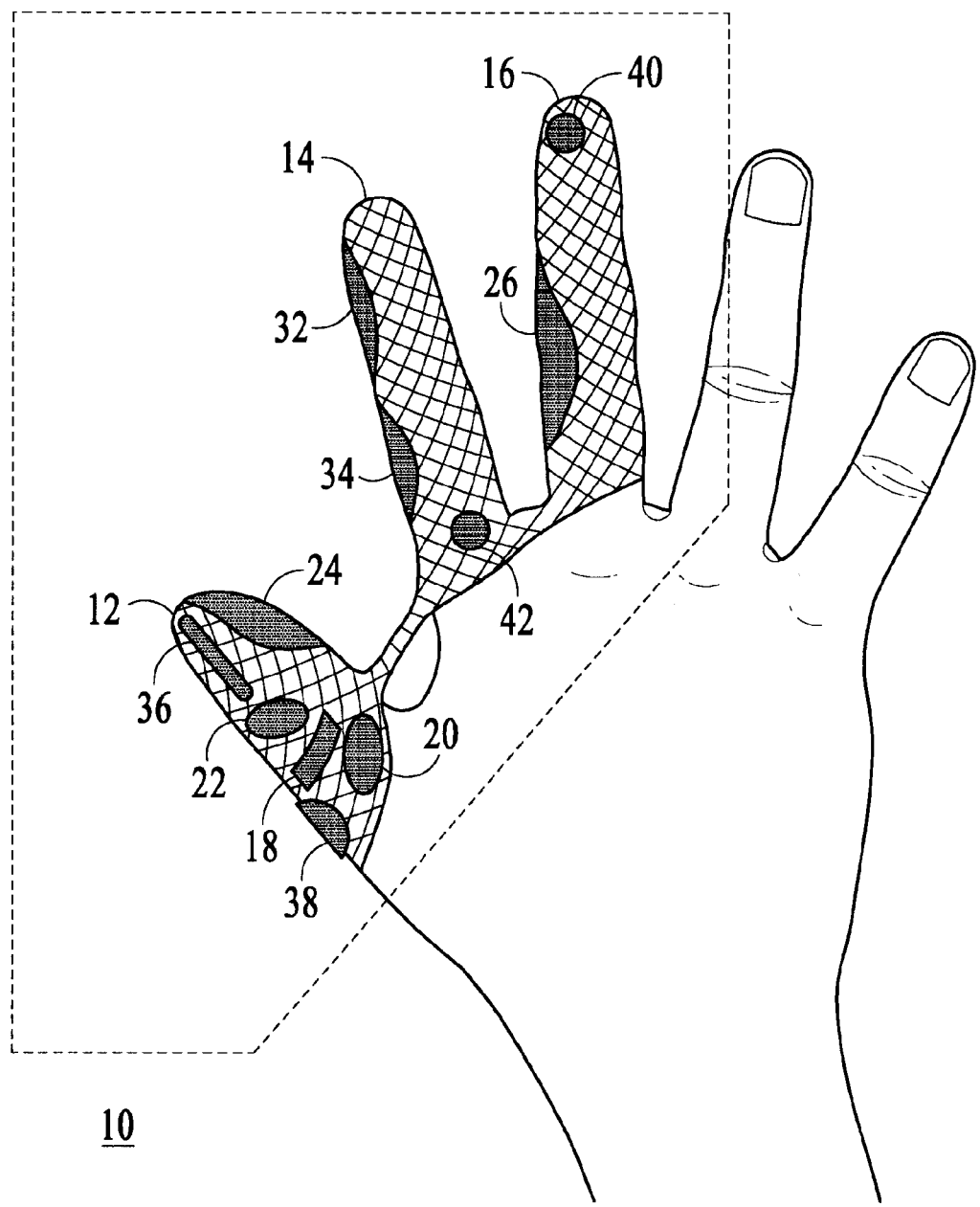
FIG. 1A shows a top view of an exemplary embodiment of an apparatus for remotely controlling computers and other electronic appliances/devices according to the present invention.
Figure 1B:
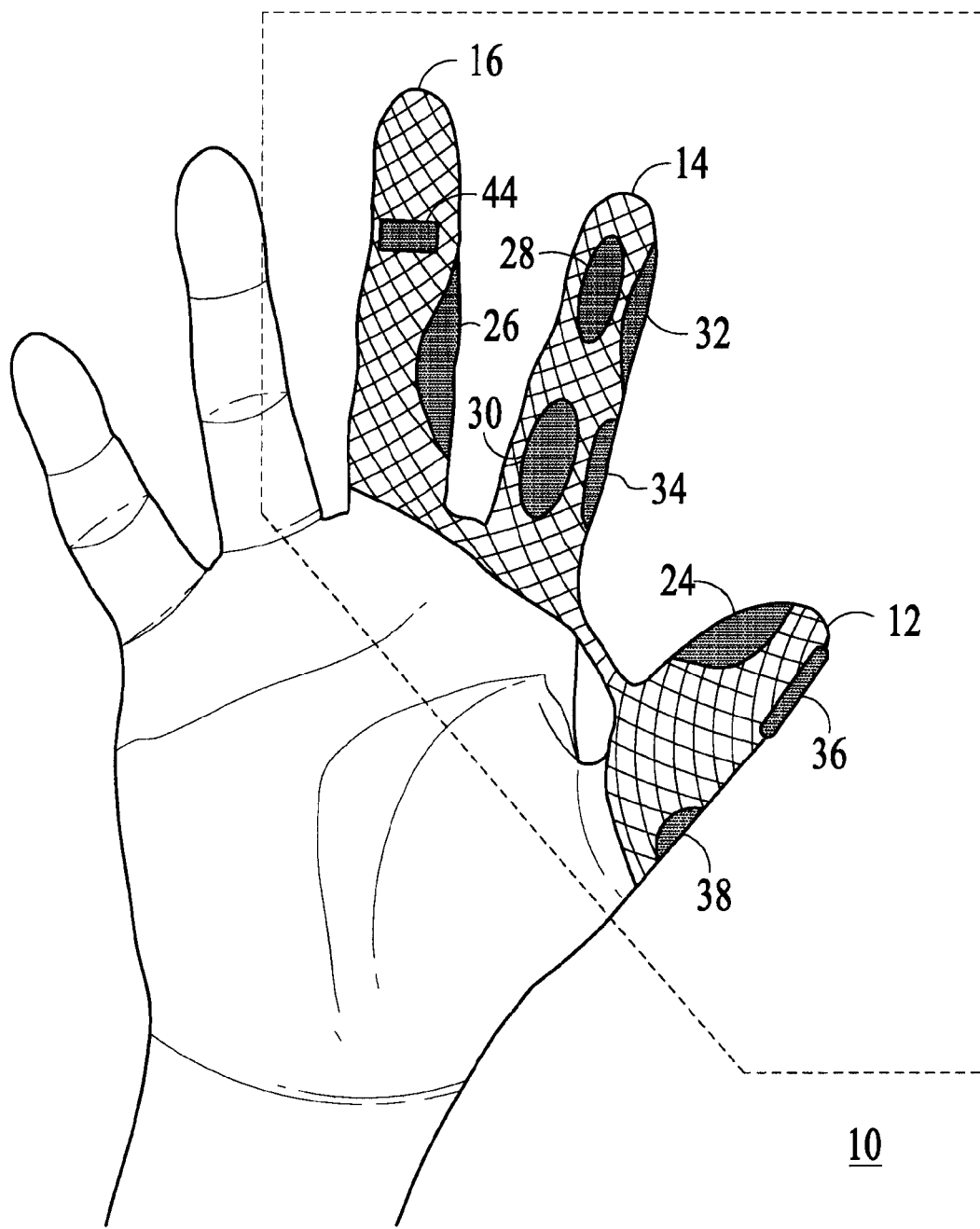
FIG. 1B shows a bottom view of the apparatus shown in FIG. 1A.
Figure 2:
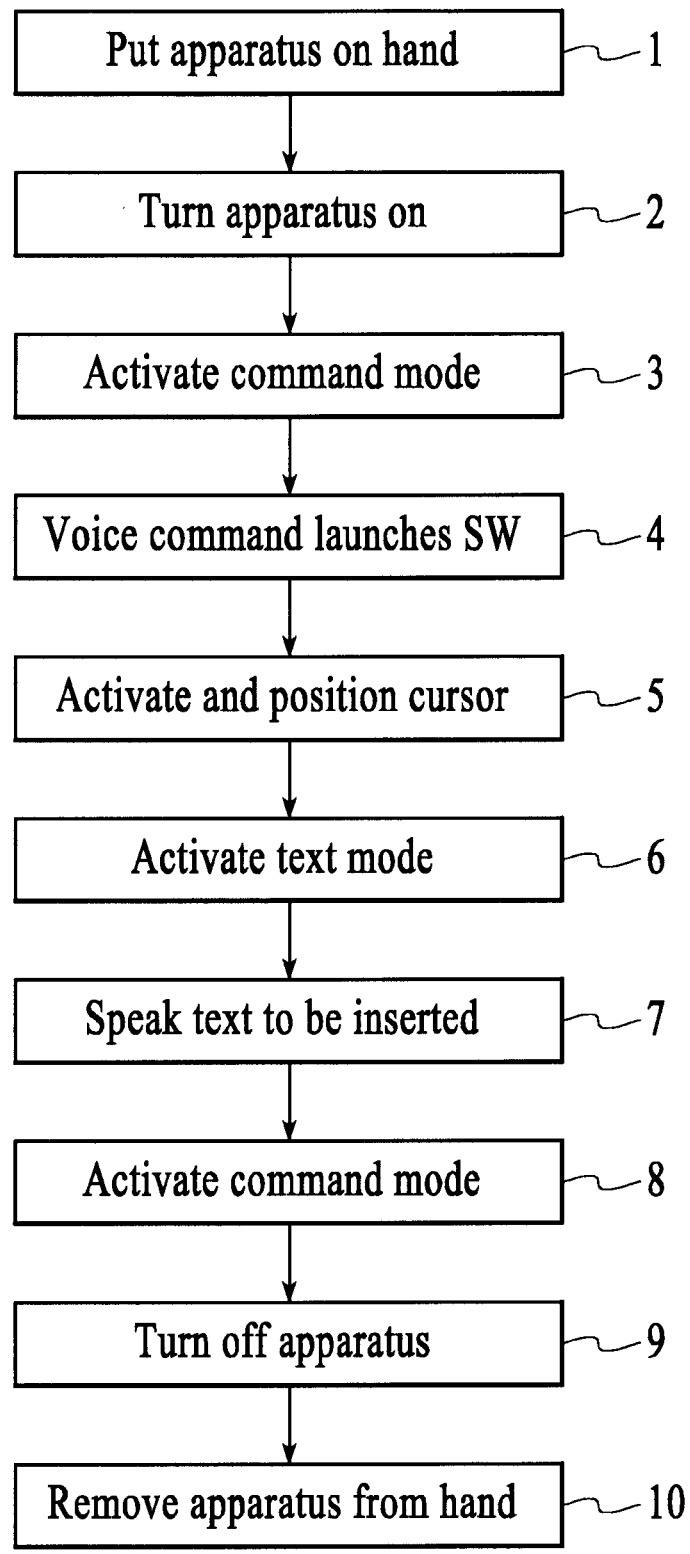
FIG. 2 shows a flowchart depicting the steps in using the present invention.

FIG. 1 shows a top view of an exemplary embodiment of an apparatus 10 for remotely operating computers and other electronic appliances/devices using a combination of voice commands and finger movements according to the present invention. FIG. 2 shows a bottom view of apparatus 10.

Apparatus 10 can be used together with voice recognition systems and large-screen, flat-panel displays that are included as part a computer network to: 1) operate the computer as is traditionally done, e.g., to browse the Internet or edit a word processing document; 2) use the computer to operate a television; and/or 3) use the computer to operate other electronic appliances/devices. The use of voice recognition systems and large-screen, flat-panel displays enables a user to operate the computer from any position and without having to be in close proximity to the display, e.g., walking around a room, reclining on a chair, etc. The network can include a plurality of large-screen, flat-panel displays, wherein different rooms of a home or office have a display so that a user can operate the computer from such rooms. Apparatus 10 can also be used in conjunction with the network to operate heating/air conditioning systems, security systems, etc.

Apparatus 10 is comprised of three finger-shaped sleeves 12, 14 and 16 which are coupled together and are designed to be worn like gloves around the thumb, index and middle fingers, respectively, of a person's hand. Sleeves 12, 14 and 16 can be fabricated from any type of material and can be constructed in any pattern such as the mesh pattern shown in FIGS. 1A and 1B. Apparatus 10 can be fabricated to have any number of sleeves which can be worn on any number of fingers. Alternative embodiments of apparatus 10 can be fabricated to be worn on one or two hands and/or on part of one or two arms.

Apparatus 10 includes an on/off switch 18, a transmitter 20 for transmitting signals to the computer being operated, and a receiver 22 for receiving signals from such computer. Apparatus 10 includes a control element in the form of a touch-sensitive thumb touchpad 24, which when held against one of the plurality of other touch-sensitive touchpads 26, 28, 30, 32, or 34 operates a computer as described below. The functions of a conventional mouse are performed by using touchpads 24, 26, and 36 shown in FIGS. 1A and 1B, and 28 and 30 shown in FIG. 1B to move a cursor on a computer screen used as the graphical interface for operating a computer. When thumb touchpad 24 is held against cursor activator touchpad 26, the cursor movement function on the screen is activated in the same manner that a cursor on a computer screen comes under the user's control when they place their hand on a conventional computer mouse.

A motion-sensitive pointer 36 is positioned on thumb sleeve 12 and extends from the top of the first knuckle of the thumb to the tip of the thumb. Moving motion-sensitive pointer 36 while maintaining contact between thumb touchpad 24 and cursor activator touchpad 26 causes corresponding movement of the cursor on the computer screen in the same manner that a cursor on a display screen is moved by moving a conventional computer mouse on a mouse pad.

When index finger touchpad 28 is tapped once against thumb touchpad 24, the object the cursor is pointing to on the computer screen at such time is activated in the same manner that an object is activated by clicking the left button of a conventional computer mouse. Tapping index finger touchpad 28 twice against thumb touchpad 24 is the equivalent of double-clicking the left button of the mouse. If index finger touchpad 28 is instead held in continuous contact with thumb touchpad 24, moving motion-sensitive pointer 36 drags the object selected on the screen to a different screen location in the same manner that an object on a computer screen is selected and dragged by holding down the left button of a mouse on the object, dragging the object to a different screen location and then releasing the left mouse button. If index finger touchpad 30 is tapped against thumb touchpad 24, the options for the object selected by the cursor will be displayed in the same manner that the options for an object are displayed on a computer screen by clicking the right button of a conventional mouse.

A microphone 38 is embedded or otherwise coupled to thumb sleeve 12 of apparatus 10. When thumb touchpad 24 is held against text-mode touchpad 32, the microphone is turned on and engaged in text-mode and any words or sounds spoken into microphone 38 by the user are inserted as text into the application displayed on the computer screen, such as inserting text into a word-processing document. When thumb touchpad 24 is held against command-mode touchpad 34, the microphone is turned on and engaged in command-mode and any words or sounds spoken into microphone 38 by the user are interpreted by the computer as instructions to perform a certain task, such as deleting highlighted text or turning an appliance on or off.

A speaker 40 is coupled to the end of middle finger sleeve 24 so that by placing the first joint of middle finger sleeve 16 near an ear and the tip of thumb sleeve 12 near their mouth, a user can use apparatus 10 as a telephone. A battery 42 is affixed near the back of index finger sleeve 14 to provide electronic power to different components of apparatus 10. A scroll touchpad 44 for scrolling up and down the pages on a computer screen is coupled to the back of middle finger sleeve 16. When thumb touchpad 24 is moved up and down against scroll touchpad 44, a user can scroll up and down, respectively, through the pages displayed on the computer screen in the same manner that the recently popularized scroll wheel of a conventional mouse enables a user to scroll up and down through the pages displayed on a computer screen.

FIG. 2 shows a flowchart depicting the steps in using apparatus 10 to operate a computer. At step 1, a person places apparatus 10 on the thumb, index and middle fingers of one hand. At step 2, the user turns apparatus 10 on using on/off switch 18. At step 3, the user touches thumb touchpad 24 to command-mode touchpad 34 to activate the command-mode operation of the computer. At step 4, the user issues a voice command to open a software application, e.g., Internet browser, word processing document, etc., to be used. At step 5, the user touches thumb touchpad 24 to cursor activator touchpad 26 to activate the cursor, and while touchpads 24 and 26 are in contact the user uses motion-sensitive pointer 36 to position the cursor on the computer screen where text is to be inserted. The user releases thumb touchpad 24 from cursor activator touchpad 26 when the cursor has been positioned where text is to be inserted. At step 6, the user touches thumb touchpad 24 to text-mode touchpad 32 to activate the text-mode operation of the computer. At step 7, the user speaks the text to be inserted into the application. At step 8, the user touches thumb touchpad 24 to activate the command-mode touchpad 34 to activate the command-mode operation of the computer and issues a voice command to close the application. At step 9, the user turns off on/off switch 18 to turn off apparatus 10. At step 10, the user removes apparatus 10 from their fingers. Alternatively, the user need not remove apparatus 10, but can wear the same as a clothing accessory.

The various elements of apparatus 10, such as touchpads 24, 26, 28, 30, 32 and 34, motion-sensitive pointer 36, microphone 38, speaker 40, battery 42 and scroll touchpad 44 can each be positioned on any one of sleeves 12, 14 or 16 such that the operable functions of apparatus 10 are implemented differently than in the manner described herein. For example, motion-sensitive pointer 36 can be implemented on index finger sleeve 14 rather than on thumb sleeve 12. In addition, apparatus 10 can be fabricated so that it automatically turns off if it is not used for a predetermined period of time. Also apparatus 10 can be fabricated to include a motion sensor enabling apparatus 10 to be turned on and off by the user snapping his or her fingers or in some other manner.

Apparatus 10 is implemented using conventional hardware and/or software which enables it to communicate with computers and other electronic appliances/devices. Apparatus 10 is designed to operate computers using existing software operating systems, such as Microsoft® Windows®, and existing software applications, such as Microsoft® Word® or a web browser. A user may wear an additional amplification device on the body to amplify signals transmitted from or received by apparatus 10. Apparatus 10 can communicate with computers over any frequencies that permit wireless, remote communications, including infrared and radio frequencies. Alternatively, apparatus 10 can be coupled to the computer using a cable. Apparatus 10 can be used to simultaneously operate multiple computers and/or appliances/devices. Apparatus 10 can be used to operate computers and appliances/devices as long as the appropriate drivers and communication protocols are installed on such computers and appliances/devices.

Apparatus 10 can be used with headgear such as goggles, monocles and glasses that are worn on the head to operate a computer. Apparatus 10 can also be used with a stylus and touch-sensitive touch screen to operate a computer. Apparatus 10 can also be used as a game controller, and can include additional touchpads for playing games. In addition, multiple persons each wearing a separate apparatus 10 can simultaneously play a game or jointly operate an application on the computer.

The aforementioned components comprising apparatus 10 can be fabricated from any material, can be coupled to any one of sleeves 12, 14, and 16, and can be secured to apparatus 10 using any means. Numerous modifications to and alternative embodiments of the present invention will be apparent to those skilled to the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

What is claimed is:

1. A wearable apparatus for processing voice input, the apparatus comprising:
    a computer resource that is operable in a command-mode and in a text-entry mode;
    a display screen coupled to the computer resource;
    a component coupled to the computer resource and operable by the user in order to selectively switch operation of the computer resource between the command-mode and the text-entry mode;
    wherein the computer resource operable to execute a plurality of applications; wherein in the text-entry mode, the computer resource is operable to process voice input as text entry that is displayed on the display screen; wherein in the command-mode, the computer resource is operable to process voice input as a command for controlling at least one of (i) the computer resource, (ii) individual applications in the plurality of applications that are being executed by the computing resource, or (iii) one or more devices that communicate with the computer resource.

2. The apparatus of claim 1, wherein the component is touch-sensitive.

3. The apparatus of claim 2, wherein the component is a touch pad.

4. The apparatus of claim 1, wherein the apparatus detects and processes motion.

5. The apparatus of claim 1, wherein the apparatus is operable as a game controller.

6. A wearable apparatus for processing voice input, the apparatus comprising:
    a computer resource that is operable in a command-mode and in a text-entry mode;
    a display screen coupled to the computer resource;
    a component provided with the computer resource and operable by the user in order to selectively switch operation of the computer resource between the command-mode and the text-entry mode;
    wherein the computer resource operable to execute a plurality of applications; wherein in the text-entry mode, the computer resource is operable to process voice input as text entry that is displayed on the display screen; wherein in the command-mode, the computer resource is operable to process voice input as a command for controlling at least one of (i) the computer resource, (ii) individual applications in the plurality of applications that are being executed by the computing resource, or (iii) one or more devices that communicate with the computer resource.

7. The apparatus of claim 6, wherein the component is touch-sensitive.

8. The apparatus of claim 7, wherein the component is a touch pad.

9. The apparatus of claim 6, wherein the apparatus detects and processes motion.

10. The apparatus of claim 6, wherein the apparatus is operable as a game controller.

* * * * *